US009261058B2

(12) United States Patent
Maurer et al.

(10) Patent No.: US 9,261,058 B2
(45) Date of Patent: Feb. 16, 2016

(54) NEAR-WALL ROUGHNESS FOR DAMPING DEVICES REDUCING PRESSURE OSCILLATIONS IN COMBUSTION SYSTEMS

(71) Applicant: ALSTOM Technology Ltd, Baden (CH)

(72) Inventors: Michael Maurer, Bad Säckingen (DE); Andreas Huber, Stuttgart (DE); Lothar Schneider, Untersiggenthal (CH); Urs Benz, Gipf-Oberfrick (CH); Diane Lauffer, Wettingen (CH)

(73) Assignee: ALSTOM TECHNOLOGY LTD, Baden (CH)

(*) Notice: Subject to any disclaimer, the term of this patent is extended or adjusted under 35 U.S.C. 154(b) by 330 days.

(21) Appl. No.: 13/950,805

(22) Filed: Jul. 25, 2013

(65) Prior Publication Data

US 2014/0053559 A1 Feb. 27, 2014

(30) Foreign Application Priority Data

Jul. 31, 2012 (EP) .................................... 12178665

(51) Int. Cl.

| | |
|---|---|
| ***F02C 1/00*** | (2006.01) |
| ***F02M 35/12*** | (2006.01) |
| ***F23R 3/00*** | (2006.01) |
| ***F23M 20/00*** | (2014.01) |

(52) U.S. Cl.

CPC ......... *F02M 35/1261* (2013.01); *F23M 20/005* (2015.01); *F23R 3/002* (2013.01); *F05B 2260/221* (2013.01); *F23R 2900/00014* (2013.01); *F23R 2900/03045* (2013.01)

(58) Field of Classification Search

CPC ............ F23R 2900/00014; F23R 2900/03045; F23R 3/002; F05B 2260/221; F05B 2260/222; F05B 2260/224; F05B 2260/2241

See application file for complete search history.

(56) References Cited

U.S. PATENT DOCUMENTS

| | | | | |
|---|---|---|---|---|
| 4,168,348 | A | 9/1979 | Bhangu et al. | |
| 6,047,552 | A * | 4/2000 | Gross et al. | 60/752 |
| 6,681,578 | B1 * | 1/2004 | Bunker | 60/772 |

(Continued)

FOREIGN PATENT DOCUMENTS

| | | |
|---|---|---|
| DE | 44 43 864 | 6/1996 |
| DE | 103 25 691 | 1/2004 |

(Continued)

*Primary Examiner* — Gerald L Sung

(74) *Attorney, Agent, or Firm* — Buchanan Ingersoll & Rooney PC

(57) ABSTRACT

A damping device for reducing pressure oscillations in a combustion system includes at least a portion provided with a first, outer wall, a second, inner wall, an intermediate plate interposed between the first wall and the second wall. This intermediate plate forms a spacer grid to define at least one chamber between said first wall and said second wall, first passages connecting each of said at least one chamber to the inner of the combustion system, and second passages connecting each of said at least one chamber to the outer of the combustion system. The second passages open at the same side of said chambers as the first passages, the second passages have a portion extending parallel to the inner wall. This parallel portion of said second passages is equipped with heat transfer enhancing means.

25 Claims, 3 Drawing Sheets

(56) References Cited

U.S. PATENT DOCUMENTS

| | | | | |
|---|---|---|---|---|
| 2001/0016162 | A1 | 8/2001 | Lutum et al. | |
| 2003/0233831 | A1 | 12/2003 | Suenaga et al. | |
| 2005/0015964 | A1 * | 1/2005 | Prociw et al. | 29/527.4 |
| 2009/0084100 | A1 | 4/2009 | Johnson et al. | |
| 2011/0048018 | A1 * | 3/2011 | Schnell et al. | 60/722 |

FOREIGN PATENT DOCUMENTS

| | | |
|---|---|---|
| DE | 102006040760 A1 | 3/2008 |
| EP | 2 295 864 | 3/2011 |
| EP | 2 299 177 | 3/2011 |
| EP | 2 362 147 | 8/2011 |
| EP | 2 385 303 | 11/2011 |

* cited by examiner

NEAR-WALL ROUGHNESS FOR DAMPING DEVICES REDUCING PRESSURE OSCILLATIONS IN COMBUSTION SYSTEMS

CROSS-REFERENCE TO RELATED APPLICATIONS

This application claims priority to European Application 12178665.1 filed Jul. 31, 2012, the contents of which are hereby incorporated in its entirety.

TECHNICAL FIELD

The present invention relates to the field of gas turbines, in particular to lean premixed, low emission combustion systems having one or more devices to suppress thermo-acoustically induced pressure oscillations in the high frequency range, which have to be properly cooled to ensure a well-defined damping performance and sufficient lifetime.

BACKGROUND

A drawback of lean premixed, low emission combustion systems is that they exhibit an increased risk in generating thermo-acoustically induced combustion oscillations. Such oscillations, which have been a well-known problem since the early days of gas turbine development, are due to the strong coupling between fluctuations of heat release rate and pressure and can cause mechanical and thermal damage and limit the operating regime.

A possibility to suppress such oscillations consists in attaching damping devices, such as quarter wave tubes, Helmholtz dampers or acoustic screens.

A reheat combustion system for a gas turbine including an acoustic screen is described in patent application DE 103 25 691. The acoustic screen, which is provided inside the mixing tube or combustion chamber, consists of two perforated walls. The volume between both walls can be seen as multiple integrated Helmholtz volumes. The backward perforated plate allows an impingement cooling of the plate facing the hot combustion chamber.

However, it is a drawback of this solution that an impingement cooling mass flow is required to prevent hot gases to enter from the combustion chamber into the damping volume. This massflow, however, decreases the damping efficiency. If the impingement mass flow is too small, the hot gases recirculate passing through the adjacent holes of the acoustic screen. This phenomenon is known as hot gas ingestion. In case of hot gas ingestion the temperature rises in the damping volume. This leads to an increase of the speed of sound and finally to a shift of the frequency, for which the damping system has been designed.

The frequency shift can lead to a strong decrease in damping efficiency. In addition, as the hot gas recirculates in the damping volume, the cooling efficiency is decreased, which can lead to thermal damage of the damping device. Moreover, using a high cooling mass flow increases the amount of air, which does not take place in the combustion. This results in a higher firing temperature and thus leads to an increase of the $NO_x$ emissions.

A solution for avoiding some of the mentioned issues is described, for example, in patent application EP 2 295 864. This document discloses a combustion device for a gas turbine, wherein a multitude of layers are braced together to form single compact Helmholtz dampers, which are cooled using an internal near-wall cooling technique close to the hot combustion chamber. Therefore, the cooling mass flow can be drastically reduced without facing the problem of hot gas ingestion, leading to less emissions and a higher damping efficiency. As single Helmholtz dampers are used, different frequencies can be addressed separately. Whether single nor a cluster of Helmholtz dampers are used, the design is based on an appropriate implementation of a near wall cooling.

A multitude of near wall cooling patents can be found, see e.g. a perforated laminated material (U.S. Pat. No. 4,168,348), a cooled blade for a gas turbine (US 2001 016 162) or a cooled wall part (DE 44 43 864). Especially the object of U.S. Pat. No. 4,168,348 is closely linked to the device according to EP 2 295 864 as it is built up using several plates laminated together to obtain the complex cooling channels.

Published European patent application EP 2 362 147 describes various solutions on how the near-wall cooling can be realized. The near-wall cooling passages are either straight passages or they show coil shaped structures parallel to the laminated plates. A drawback of this solution is that measures have to be implemented to establish a symmetric velocity profile at the opening towards the acoustic damping volume. The near wall cooling passage has to be designed in such a way that the flow field inside the acoustic neck is not influenced by the cooling mass flow entering the acoustic damping volume.

Measures to realize an adequate velocity inlet profile at the openings towards the acoustic damping volume are described in patent application EP 2 299 177. To avoid the above-mentioned impact, always a pair of cooling channels enters the damping volume at the same location in opposite direction. Of Course, multiple pairs of cooling channels can also enter the damping volume at the same location. To reduce the kinetic energy of the flow and to restrict a possible fluctuating motion of the cooling air inside the opposite channels, the channels are separated using a barrier. In addition the end of the cooling passage is designed in form of a diffuser to reduce the velocity of the cooling mass flow in front of the barrier. The additional measures to realize an adequate velocity inlet profile increase the design efforts and react sensitive to the common manufacturing tolerances.

A potential problem in operation of such "near wall cooling" or "micro cooling" systems is the risk of debris. The cooling air from the compressor of a gas turbine plant may contain dust particles that tend to block the flow of air through the micro cooling channels. But due to the above-mentioned reasons and due to a negative influence on the efficiency of the gas turbine larger dimensioned cooling channels (with the consequence of an increased flow of cooling air) are not applicable.

SUMMARY

The technical aim of the present invention is to provide a near wall cooling system for a damping device of a combustion system, which damps thermo-acoustically induced oscillations in the high frequency range and avoids the above-mentioned disadvantages. The new invention enables an optimized cooling and lifetime performance of high frequency damping systems with reduced cooling air mass flow requirements. It therefore eliminates the said drawbacks of impingement cooled acoustic screens and Helmholtz dampers. The near wall cooling design according to the present invention enables also an increased damping efficiency and reduces the risk of debris in the cooling channels and the risk of frequency detuning of the damper.

BRIEF DESCRIPTION OF THE DRAWINGS

Further characteristics and advantages of the invention will be more apparent from the description of preferred embodiments of the invention illustrated by way of non-limiting example in the accompanying drawings.

DETAILED DESCRIPTION

Figure 1:
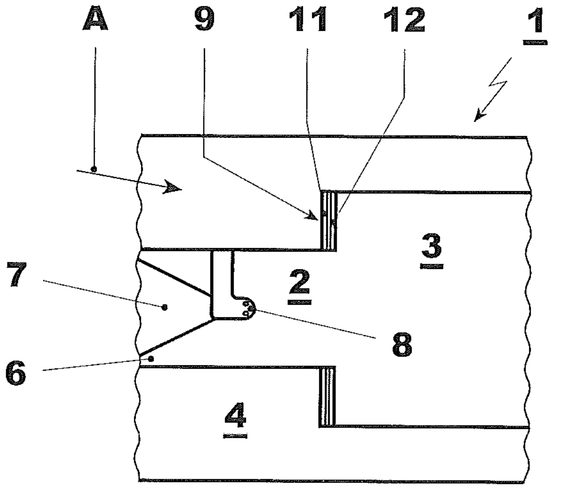
FIG. 1 is a schematic view of a reheat combustion system in a gas turbine with sequential combustion.

With reference to the figures, these show a reheat combustion system for a gas turbine with sequential combustion, indicated overall by the reference number 1. Upstream of the reheat combustion system 1 a compressor followed by a first combustion chamber and a high pressure gas turbine are provided (not shown). From the high pressure gas turbine the hot gases are fed into the reheat combustion system 1, wherein fuel is injected to be combusted. Thus a low pressure turbine expands the combusted flow coming from the reheat combustion system 1. In particular, the reheat combustion system 1 comprises a mixing tube 2 and a combustion chamber 3 inserted in a plenum 4. Air A from the compressor is fed into the plenum 4. The mixing tube 2 is arranged to be fed with the hot gases through an inlet 6 and is provided with vortex generators 7. According to a preferred embodiment of the reheat combustion system 1 four vortex generators 7 extending from the four walls of the mixing tube 2 are arranged (only one of the four vortex generators 7 is shown in FIG. 1). A lance with nozzles 8 is arranged for injecting fuel into the hot gases and to generate a fuel-air-mixture. Downstream of the mixing tube 2 the fuel-air-mixture enters the combustion chamber 3, where combustion occurs. At the exit of the mixing tube 2 a front panel limits the combustion chamber 3 at its rear end.

The reheat combustion system 1 comprises a portion 9, provided with a first, outer wall 11 and a second, inner wall 12, provided with first passages 14 connecting the zone between the first and second wall 11, 12 to the inner of the combustion system 1 and second passages 15 connecting said zone between the first and second wall 11, 12 to the outer of the combustion system 1.

For sake of clarity, in the following the portion 9 is described as the portion at the front panel of the mixing tube 2, it is anyhow clear that this portion 9 can be located in any position of the mixing tube 2 and/or the combustion chamber 3.

Between the first wall 11 and the second wall 12 a plurality of chambers 17 is defined, each chamber 17 being connected with at least one first passage 14 to the mixing zone 2 or combustion chamber 3 and with at least one second passage 15 to the plenum 4. Every chamber 17 defines a Helmholtz damper.

Preferably, the chambers 17 are defined by one or in a different embodiment by more than one first plates 16, interposed between the first wall 11 and the second wall 12.

Figure 2:
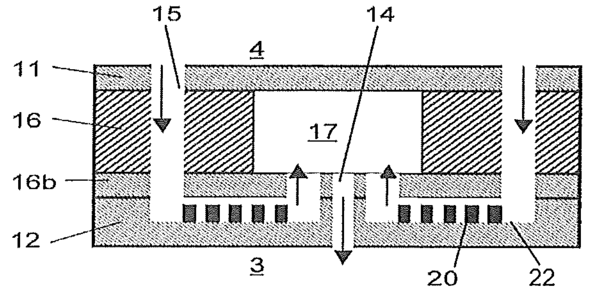
FIG. 2 shows a cross section through a wall portion of a mixing tube or a combustion chamber according to a first embodiment of the invention.
Figure 3:
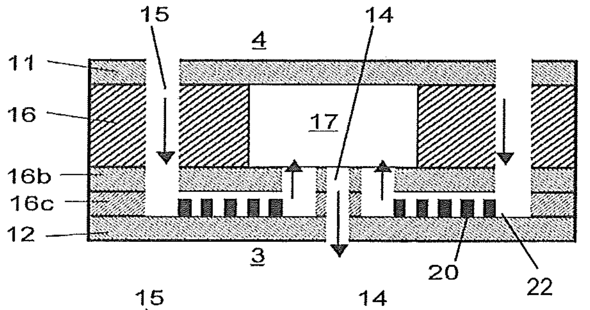
FIG. 3 shows a cross section through a wall portion according to another embodiment.

In first embodiments of the invention, the chambers 17 are defined by holes indented in the first plate 16. In particular, the holes, defining the chambers 17, can be through holes (see FIGS. 2 and 3). In these embodiments, the combustion system 1 may also comprise a second plate **16*b* laying side-by-side with the first plate 16, defining at least a side of the chamber 17 and also defining the first and/or second passages 14, 15 (FIGS. 2 and 3). In addition, the combustion system 1 may also comprise a third plate 16*c* coupled to the second plate 16*b* and also defining the first and/or second passages 14, 15 (FIG. 3). In particular, in order to define the second passages 15, the second plate 16*b* has through holes and the third plate 16*c*** has through slots connected one another.

As known in the art, each gas turbine has a plurality of combustion systems 1 placed side-by-side. Advantageously all the chambers 17 and first passages 14 of a single combustion system 1 have the same dimensions. And these dimensions are different from those of the other combustion systems 1 of the same gas turbine; in different embodiments of the invention, the chambers 17 of a single combustion system 1 have different dimensions. This lets different acoustic pulsations be damped very efficiently in a very wide acoustic pulsation band.

Preferably the first plate 16 is the front panel at the exit of the mixing tube 2. In this case this wall is manufactured in one piece with the mixing tube 2. All walls and plates are connected to each other by brazing. Moreover, the passages 14, 15 and chambers 17 are indented by drilling, laser cut, water jet, milling or another suitable method.

FIG. 2 shows a first preferred embodiment of the invention with first wall 11 and second wall 12 enclosing the first plate 16 and the second plate **16*b*** connected side-by-side therewith.

The chambers 17 are defined by through holes indented in the first plate 16; moreover the sides of the chambers 17 are defined by the first wall 11 (the side towards the plenum 4) and the second plate **16*b* (the side connected towards the combustion chamber 3). The first passage 14, connecting the inner of the chamber 17 to the combustion chamber 3, is drilled in the second wall 12 and second plate 16*b*. The second passage 15 comprises a portion drilled in the second plate 16*b* and opening in the chamber 17, and a further portion milled into the second wall 12 in the form of a groove, and further portions drilled in the second plate 16*b*, in the first plate 16 and in the first wall 11 opening into the plenum 4. The second passage 15 is formed in a rectangular cross section design with four boundary surfaces, namely a lower boundary surface 22 at the bottom of the groove, two lateral surfaces 23, 24 of the groove and an upper boundary surface formed by the second plate 16*b* that covers the groove. In the following, the width of passage 15 is defined as the distance between the two sidewalls 23, 24, and the height of passage 15 is defined as the distance between the lower and the upper boundary surface 24, 16*b***.

The height of the passage 15 is regularly in the range of 0.3 mm to 3 mm, preferably in the range of 0.5 mm to 2 mm.

As mentioned above, the cooling air flowing through the passages 15 may contain dust particles of roughly the same size. Consequently, these passages 15 are subject to the risk of blocking by debris. This risk is minimized by a cross section design of passage 15 with its width being a multiple of its height. For example, the width exceeds the height by a factor 1.5 to 25, preferably by a factor 2 to 10, more preferably by a factor 2 to 5.

The increase of flow cross section is compensated by the arrangement of roughness features in the form of swirl generators, ribs, pin-fin arrays etc. in a suitable pattern and dimension. Due to an increased pressure drop, caused by the plurality of roughness features, the flow rate is reduced, but the cooling effect is increased.

An additional essential advantage of this structure is the potentiality of arranging the roughness features in variable patterns and dimensions along the cooling passage 15, thus adaptable to variable flow or cooling requirements along the flow path.

FIG. 3 shows another embodiment of the invention with the third plate 16*c* connected to the second plate 16*b*. In this embodiment the chambers 17 are defined by through holes of the first plate 16 delimited by the first wall 11 and second plate 16*b*. The first passages 14 are drilled in the second and third plates 16*b*, 16*c* and in the second wall 12.

The second passage 15 has two spaced apart portions drilled in the second plate 16*b* and a portion drilled in the third plate 16*c*, connecting the before mentioned spaced apart portions drilled in the second plate 16*b*. Naturally, the second passage 15 also has portions drilled in the first plate 16 and first wall 11. This embodiment is particularly advantageous, because the chambers 17, and the first and second passages 14, 15 are defined by through holes and can be manufactured in an easy and fast way, for example by drilling, laser cut, water jet and so on.

Figure 5:
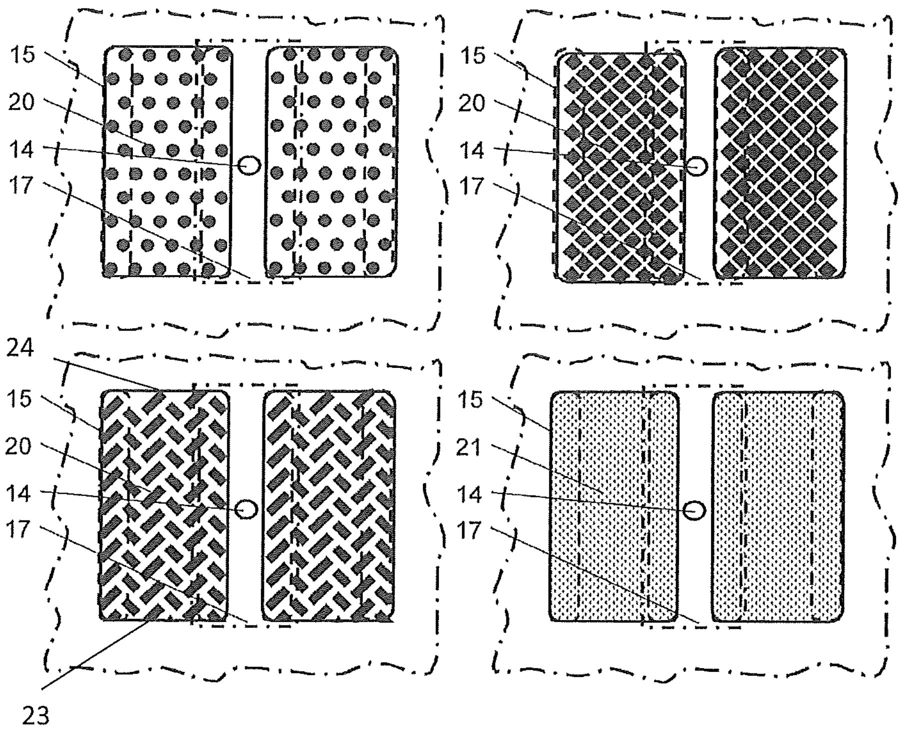
FIG. 5 shows passages with heat transfer enhancing structures connected to the surface.

The operation of the combustion system according to the invention is substantially the following. Air A from the compressor enters the plenum 4 and, thus, through the second passages 15 enters the chambers 17. As presented in FIG. 5, the second passages 15 are equipped with heat transfer enhancing features 20 (such as pin-fin arrays with cylinders, diamonds or various arrangements of cooling ribs). The arrangement represents a heat exchanger with high thermal efficiency.

The roughness features 20 are connected to second wall 12 or milled into second wall 12 to guarantee a high thermal contact. Towards the third plate 16*b*, the thermal contact should be minimized to prevent a low thermal conductivity towards the plenum 4.

Figure 4:
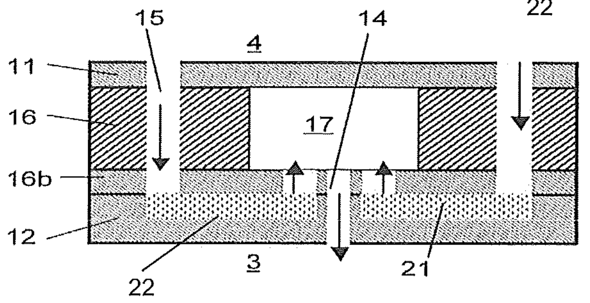
FIG. 4 shows a cross section through a wall portion according to a third embodiment of the invention.

For even higher thermal efficiencies, the second passage 15 could be equipped with metallic foams 21, as presented in FIG. 4. Such metallic foams incorporate a higher surface enhancement compared to the known pin-fin arrays, and are gas permeable structures which can completely fill the cross-section of the passages.

The small cooling mass flow (due to the high pressure drop over the heat transfer enhancement features 20 or the metallic foam 21) is used efficiently to pick up the heat load from the combustion chamber 3. As the arrangement covers a wider portion of the second wall 12 compared to a passage-like design with a coil shaped arrangement, the temperature distribution is more homogeneous. A homogenous temperature distribution reduces the thermal stresses and can increase the lifetime.

In addition, the impulse level at the openings towards the acoustic cooling volumes is reduced compared to a passage-like design. No additional features are needed (like the above mentioned diffusers) to ensure an adequate velocity profile. After passing the damping volume 17, the cooling air leaves through the first passages 14, and enters finally the combustion chamber 3.

What is claimed is:

1. A damping device for reducing pressure oscillations in a combustion system, the damping device comprising:

a portion provided with a first outer wall, a second inner wall, an intermediate plate interposed between the first outer wall and the second inner wall, wherein the intermediate plate forms a spacer grid to define at least one chamber between the first outer wall and the second inner wall, first passages connecting each of the at least one chamber to the interior of the combustion system, and second passages connecting each of the at least one chamber to the exterior of the combustion system, wherein the second passages open at the same side of said at least one chamber as the first passages, the second passages have a section extending parallel to the second inner wall, wherein at least this parallel section of the second passages is equipped with heat transfer enhancing means and wherein the second passages have a non-circular cross section design.

2. The damping device according to claim 1, wherein the second passages have a rectangular cross section.

3. The damping device according to claim 1, wherein the parallel section of the second passages are formed as grooves in the second inner wall, the grooves comprising a lower surface and two side walls, and the grooves being capped by a second plate.

4. The damping device according to claim 2, wherein the second passages have a rectangular cross section with a height, i.e. a distance between a lower boundary surface and an upper boundary surface, and a width, i.e. a distance between the opposed side walls, wherein the ratio of width to height is in the range from 1.5 to 25.

5. The damping device according to claim 4, wherein the width-to-height ratio of the passages is between 2 and 5.

6. The damping device according to claim 2 wherein the height of the passages is in the range from 0.3 mm to 3 mm, preferably in the range from 0.5 mm to 2 mm.

7. The damping device according to claim 2, wherein the heat transfer enhancing means in the second passages are roughness features, connected to the surface inside the second passages.

8. The damping device according to claim 7, characterized in that the heat transfer enhancing means are swirl generators, ribs, pin-fin arrays, nubs, diamonds or roughness features.

9. The damping device according to claim 8, wherein the heat transfer enhancing means extend between a lower surface of the second inner wall and an opposed upper surface.

10. The damping device according to claim 9, wherein the heat transfer enhancing means connect to the lower surface of the second inner wall.

11. The damping device according to claim 1, wherein the heat transfer enhancing means is a gas permeable structure of a material with a thermal conductivity completely filling the cross section of the passages.

12. The damping device according to claim 11, wherein a metallic foam fills the cross section of the second passages.

13. The damping device according to claim 1, wherein the at least one chamber is formed by holes in the intermediate plate.

14. The damping device according to claim 13, wherein the holes, defining the at least one chamber, are through holes in the intermediate plate.

15. The damping device according to claim 14, wherein the first outer wall defines the outer wall of the at least one chamber.

16. The damping device according to claim 1, wherein a second plate lies side-by-side with the intermediate plate and defines an inner side of the at least one chamber and defines the first passages and the second passages by through holes in the second plate.

17. The damping device according to claim 16, wherein a third plate is interposed between the second plate and the second inner wall and also defining the first passages and said second passages.

18. The damping device according to claim 17, wherein in order to define the first passages, the second plate has through holes and the third plate has through holes.

19. The damping device according to claim 17, wherein in order to define the second passages, the second plate has through holes and the third plate has through slots.

20. The damping device according to claim 1, wherein, the second passages have a rectangular cross section, at least in the section parallel to the second inner wall, the second inner wall defines at least one inner side of the second passages in this section, and the heat transfer enhancing means are connected to the second inner wall in the parallel section.

21. The damping device according to claim 7, wherein a plurality of roughness features are arranged in a pattern, wherein the distance between adjacent roughness features and/or the dimension of adjacent roughness features is constant.

22. The damping device according to claim 7, further comprising:

a plurality of roughness features arranged in a pattern and the distances between the individual roughness features and/or the dimension of the individual roughness features differs in flow direction and/or orthogonally to the flow direction according to mass flow or heat transfer requirements of the combustion system.

23. The damping device according to claim 1, wherein the at least one chamber is connected via first passage to the mixing tube of a reheat combustion system of a gas turbine.

24. The damping device according to claim 1, wherein the at least one chamber is connected via first passage to a combustion chamber.

25. The damping device according to claim 1, wherein the combustion system is a reheat combustion system in a gas turbine with sequential combustion.

* * * * *